(12) United States Patent
Gerdstrom

(10) Patent No.: US 7,684,327 B2
(45) Date of Patent: Mar. 23, 2010

(54) TEMPORARY DISABLING OF A MEMBER OF A VIRTUAL CONCATENATION GROUP

(75) Inventor: Flemming Gerdstrom, Bagsværd (DK)

(73) Assignee: Tellabs Operations, Inc., Naperville, IL (US)

( * ) Notice: Subject to any disclaimer, the term of this patent is extended or adjusted under 35 U.S.C. 154(b) by 848 days.

(21) Appl. No.: 11/291,854

(22) Filed: Nov. 30, 2005

(65) Prior Publication Data

US 2006/0168330 A1 Jul. 27, 2006

(51) Int. Cl.
*G06F 11/00* (2006.01)

(52) U.S. Cl. .................. 370/231; 370/225

(58) Field of Classification Search .......... 370/229, 370/230, 231, 235, 236, 236.1, 236.2, 468, 370/477, 217–225; 709/225, 226, 232, 238
See application file for complete search history.

(56) References Cited

U.S. PATENT DOCUMENTS

| | | | | |
|---|---|---|---|---|
| 5,321,688 | A * | 6/1994 | Nakano et al. | 370/244 |
| 6,304,549 | B1 * | 10/2001 | Srinivasan et al. | 370/230 |
| 7,058,008 | B1 * | 6/2006 | Wilson et al. | 370/216 |
| 7,283,478 | B2 * | 10/2007 | Barsheshet et al. | 370/238 |
| 7,411,900 | B2 * | 8/2008 | Acharya et al. | 370/217 |
| 7,616,558 | B2 * | 11/2009 | Christensen et al. | 370/221 |
| 2004/0252633 | A1 | 12/2004 | Acharya et al. | |
| 2006/0140225 | A1 * | 6/2006 | Christensen et al. | 370/536 |

FOREIGN PATENT DOCUMENTS

| EP | 1675292 A1 * | 6/2006 |
|---|---|---|
| EP | 1675293 A1 * | 6/2006 |
| EP | 1850536 A1 * | 10/2007 |

OTHER PUBLICATIONS

Beghdadi, Mohamed et al., "Evolving Metro Transport and Switching Infrastructures: Path to Efficient Ethernet Services for Carrier Networks," 5th International Workshop Design of Reliable Communications Networks, DRCN 2005, Oct. 2005, pp. 523-529.*
"Link capacity adjustment scheme (LCAS) for virtual concatenated signals," ITU-T G.7042/Y.1305, Nov. 2001, pp. 1-16.
Choy, L., "Virtual concatenation tutorial: enhancing SONET/SDH networks for data transport," *Journal of Optical Networking* 1(1):18-29 (Jan. 2002).

* cited by examiner

*Primary Examiner*—Donald L Mills
(74) *Attorney, Agent, or Firm*—Hamilton, Brook, Smith & Reynolds, P.C.

(57) ABSTRACT

A member of a Virtual Concatenation Group (VCG) can be temporarily disabled under control of a Link Capacity Adjustment Scheme (LCAS). The VCG comprises a number of link members, in which payload data are transmitted. A management command ($M_{LOCKOUT}$) is transmitted from a management system to at least one of the source and sink side for one member requesting the member to be temporarily disabled. In response to the management command a forward control message is transmitted from the source side comprising a message ($F_{DNU}$) indicating that payload data of the member shall not be used, and transmission of payload data for the member is discontinued. In this way temporary disabling of a VCG member is provided, in which it is ensured that the same member is enabled again when the operation requiring the disabling is completed, and which can be handled as a separate function by the management system.

25 Claims, 9 Drawing Sheets

TEMPORARY DISABLING OF A MEMBER OF A VIRTUAL CONCATENATION GROUP

RELATED APPLICATIONS

This application claims priority under 35 U.S.C. §119 or 365 to European Patent Application No. 04388096.2 filed Dec. 23, 2004, the entire teaching of which are incorporated herein by reference.

FIELD OF THE INVENTION

The invention relates to a method of temporarily disabling a member of a Virtual Concatenation Group that is transported from a source side to a sink side in a telecommunications network under control of a Link Capacity Adjustment Scheme, wherein said Virtual Concatenation Group comprises a number of link members, in which payload data to be received at the sink side can be transmitted. The invention further relates to a network element adapted to function as a source side in a telecommunications network, a network element adapted to function as a sink side in a telecommunications network, and to a corresponding computer program and computer readable medium.

BACKGROUND OF THE INVENTION

Generic transport networks, such as OTN (Optical Transport Network), SDH (Synchronous Digital Hierarchy) or SONET (Synchronous Optical NETwork) networks, are widely used for transmission of large data streams (e.g. a large number of telephone channels) between network elements in the telecommunications networks. These synchronous systems also allow the transmission of asynchronous signals, e.g. signals from a PDH (Plesiochronous Digital Hierarchy) with data rates of 140 Mbit/s, 34 Mbit/s or 2 Mbit/s, which may be mapped into e.g. a SDH system.

International standards prescribe how to place the individual bytes in the frames of the synchronous system. A detailed structure shows how this mapping is made. In the SDH system the payload data signals are placed together with overhead signals in so-called virtual containers, which may be higher order virtual containers, e.g. VC-4, or lower order virtual containers, e.g. VC-12 or VC-3.

SDH signals are a serial flow of logical 1's and 0's that may be subdivided into a sequence of bytes of 8 bits each. The signals are structured such that the transmitted bit flow may be subdivided into a plurality of channels for different applications. The basic structure of an SDH signal is a so-called Synchronous Transport Module at level 1 (STM-1), which may be considered as a frame having 9 rows and 270 bytes in each row. Of the 270 bytes the first nine bytes in each row are used for overhead and pointers, so that 261 bytes in each row constitute the transport capacity of the frame. An STM-1 frame is transmitted with a data rate of 155.52 Mbit/s. Corresponding STM frames of higher order (STM-N) also exist, and these are transmitted with corresponding higher data rates. As examples, STM-4, STM-16, STM-64 and STM-256 are specified.

The signals are transmitted one row at a time with the uppermost row first, and each row is transmitted from the left to the right. Each byte is transmitted with the most significant bit first. The transport capacity of the STM-1 frame, i.e. the 9 rows of 261 bytes each, constitutes a higher order virtual container VC-4. The payload capacity of a VC-4 is 149.76 Mbit/s. For the lower order virtual containers, which may be mapped into the VC-4, the payload capacity is 49.536 Mbit/s for the VC-3 and 2.176 Mbit/s for the VC-12.

These bit rates are well suited for transporting e.g. PDH signals, which, as mentioned, the SDH system is frequently used for. In that case a VC-4 may e.g. contain a PDH channel of 140 Mbit/s, or it may be subdivided into a plurality of smaller virtual containers. It may e.g. contain 3 VC-3s each transporting a PDH channel of 34 Mbit/s or 63 VC-12s each transporting a PDH channel of 2 Mbit/s.

However, many services or data types require bit rates, which cannot utilize the possible bit rates of the virtual containers effectively. As an example, a data rate of 10 Mbit/s is required, when Ethernet data are transmitted through an SDH network. The smallest virtual container that will accommodate a 10 Mbit/s payload is a VC-3, which means that the transport efficiency is as low as 20%. Other data types with poor transport efficiencies in SDH are Fast Ethernet, ESCON, Fibre Channel and Gigabit Ethernet. The transport efficiency for such data types may be improved by concatenating virtual containers. Two types of concatenation exist, contiguous concatenation and virtual concatenation.

Contiguous concatenation is used when payloads greater than the capacity of e.g. a VC-4 is to be transmitted. In that case several containers may be locked to each other so that the concatenated containers are transmitted together through the network, in which the relevant network elements must be set up by the management system to handle the concatenated containers. As examples of contiguous concatenated containers, VC-4-4c, VC-4-16c and VC-4-64c can be mentioned. These containers can be transmitted in STM-4, STM-16 and STM-64 frames.

By virtual concatenation, the payload may be divided between a number of virtual containers in a more flexible way. For instance, Ethernet data of 10 Mbit/s may be transmitted in 5 VC-12 containers. Although the 5 containers constitute a Virtual Concatenation Group (VCG), they are transmitted as individual containers through the network, so that by virtual concatenation, there are no special requirements on the existing network elements or strict routing constraints for the network. The virtual containers of a VCG are also called the members of the group. In the receiving network element the virtual containers of the VCG can be recognized on their overhead, and a differential delay caused by difference in (optical) path length can be compensated, so that the data of the 5 containers can be combined again. Thus by means of virtual concatenation the transport efficiency is improved considerably, and network operators can implement connections that are more appropriate for the above-mentioned services by providing a much more flexible bandwidth granularity. Further, virtual concatenation is transparent to intermediate network elements, which means that it can be implemented without the need for any upgrade of the existing network elements.

Many of these services have variable requirements for bandwidth over time, and thus there is a need to be able to increase or decrease the capacity of a VCG link by adding or removing members from the group in order to meet the bandwidth needs of the application. The capacity of the VCG should be increased or decreased hitless, where a hit is a situation in which loss of data occurs. Further, in case a failure is experienced in the link for a member in the network, the transmission capacity needs to be decreased to avoid that the whole VCG fails. These functions can be handled by the Link Capacity Adjustment Scheme (LCAS) for virtual concatenated signals as specified by the ITU-T Recommendation G.7042/Y.1305. This Recommendation defines the required states at the source and at the sink side of the link as well as the control information exchanged between both the source and the sink side of the link to enable the flexible resizing of the virtual concatenated signal.

In LCAS, synchronization of changes in the capacity of the transmitter (source side) and the receiver (sink side) is achieved by control packets. Each control packet describes the state of the link during the next control packet. Changes are sent in advance so that the receiver can switch to the new configuration at a predefined time. The control packet consists of fields dedicated to specific functions. Control packets contain information sent from source to sink, i.e. the forward direction, and from sink to source, i.e. the return direction. The information in the forward direction comprises a control field providing commands indicating the status of the individual members of the group. The information in the return direction comprises an MST (Member Status) field, which reports the member status from sink to source with the two possible states OK and FAIL.

The network elements of a link are controlled by one or more management systems. The management system can instruct the end network elements, i.e. source or sink side, to add members to or remove members from the group. This is done by sending management messages.

The three main functions of the LCAS is to increase the VCG capacity by the addition of members, to decrease the VCG capacity by temporary removal of members due to a failure, and to decrease the VCG capacity by permanent removal of members due to a change in the bandwidth needs of the application.

However, in addition to the three main functions described above, there is often a need to be able to temporarily disable a member of the group from carrying payload. As an example, this will be needed when doing planned rerouting in the network. With the existing scheme this can only be done by first removing the member permanently, and then subsequently, when the rerouting has been done, adding that member again. However, in this way there is a risk that the channel that is added will not be the same as the one removed, or even that a channel is no longer available. Further, from a management point of view the two functions of removing a member permanently and disabling it temporarily are very different in nature. Thus the existing functions of the LCAS scheme are not suitable for disabling a member of the group only temporarily, while doing rerouting in the network.

SUMMARY OF THE INVENTION

Therefore, it is an object of the invention to provide a method of temporarily disabling a member of a Virtual Concatenation Group, in which it is ensured that the same member is enabled again when the operation requiring the disabling is completed, and which can be handled as a separate function by the management system.

According to the invention the object is achieved in that the method comprises the steps of transmitting a first management command from a management system to at least one of said source side and sink side for one of said link members requesting said one link member to be temporarily disabled; and in response to said first management command, transmitting a first forward control message from the source side to the sink side comprising a message indicating that payload data of said one link member shall not be used and discontinuing transmission of payload data for said one link member.

When the forward control message comprising a message indicating that payload data of the link member shall not be used is sent from the source side and transmission of payload data for the link member is discontinued under control of a management command a temporary situation is achieved similar to the one known for the situation where a failure has been detected, and thus the same member can be re-enabled again at a later point of time. Further, the re-enabling will be somewhat faster than if the member had been permanently removed and then subsequently added to the group again.

When the method further comprises the steps of transmitting said first management command to said source side; and receiving said first forward control message at the sink side, and, in response thereto, discontinuing the reception of payload data for said one link member on the sink side, the temporary disabling can be initiated from the source side.

In this case the method may further comprise the steps of transmitting subsequently a second management command from the management system to said source side for said one link member requesting said one link member to be re-enabled; in response to said second management command, transmitting a second forward control message from the source side to the sink side comprising a message indicating that payload data of said one link member can again be used and starting transmission of payload data for said one link member; and receiving said second forward control message at the sink side, and, in response thereto, starting the reception of payload data for said one link member on the sink side. In this way the disabled member can easily be re-enabled.

Alternatively, the method may further comprise the steps of transmitting said first management command to said sink side; transmitting in response to said first management command a first return control message from the sink side to the source side comprising a fail message for said one link member; and receiving said first return control message at the source side and transmitting said first forward control message in response thereto. This allows the temporary disabling to be initiated from the sink side.

In this case the method may further comprise the step of discontinuing the reception of payload data for said one link member on the sink side in response to said first management command, which ensures a process very similar to the corresponding process for removing a member permanently. Alternatively, the method may further comprise the step of discontinuing the reception of payload data for said one link member on the sink side in response to said first forward control message, which allows the disabling of the member to be performed in a hitless manner, also when the disabling is initiated at the sink side.

Further, this method may comprise the steps of transmitting subsequently a second management command from the management system to said sink side for said one link member requesting said one link member to be re-enabled; transmitting in response to said second management command a second return control message from the sink side to the source side comprising an OK message for said one link member; receiving said second return control message at the source side, and in response thereto, transmitting a second forward control message from the source side to the sink side comprising a message indicating that payload data of said one link member can again be used and starting transmission of payload data for said one link member; and receiving said second forward control message at the sink side, and, in response thereto, starting the reception of payload data for said one link member on the sink side. In this way the disabled member can easily be re-enabled.

Expediently, the telecommunications network can be a Synchronous Digital Hierarchy (SDH) network, or it can be an Optical Transport Network (OTN).

As mentioned, the invention further relates to a network element adapted to function as a source side in a telecommunications network, in which a Virtual Concatenation Group can be transported from said source side to a sink side under control of a Link Capacity Adjustment Scheme, wherein said Virtual Concatenation Group comprises a number of link members, in which payload data to be received at the sink side can be transmitted. When the network element is arranged to receive a first management command from a management system for one of said link members requesting said one link member to be temporarily disabled; and in response to said first management command, transmit a first forward control message to the sink side comprising a message indicating that payload data of said one link member shall not be used and discontinue transmission of payload data for said one link member, a network element is provided, which ensures that the temporary disabling can be initiated from the source side, and that the same member can be enabled again when the operation requiring the disabling is completed.

In this case the network element may further be arranged to receive subsequently a second management command from the management system for said one link member requesting said one link member to be re-enabled; and in response to said second management command, transmit a second forward control message to the sink side comprising a message indicating that payload data of said one link member can again be used and start transmission of payload data for said one link member. In this way the disabled member can easily be re-enabled.

As mentioned, the invention further relates to a network element adapted to function as a sink side in a telecommunications network, in which a Virtual Concatenation Group can be transported from a source side to said sink side under control of a Link Capacity Adjustment Scheme, wherein said Virtual Concatenation Group comprises a number of link members, in which payload data to be received at the sink side can be transmitted. When this network element is arranged to receive a first management command from a management system for one of said link members requesting said one link member to be temporarily disabled; and transmit in response to said first management command a first return control message to the source side comprising a fail message for said one link member, a network element is provided, which ensures that the temporary disabling can be initiated from the sink side, and that the same member can be enabled again when the operation requiring the disabling is completed.

In this case the network element may further be arranged to discontinue the reception of payload data for said one link member in response to said first management command, which ensures a process very similar to the corresponding process for removing a member permanently. Alternatively, the network element may further be arranged to continue reception of payload data after the transmission of said first return control message; receive in response to said first return control message a first forward control message from the source side comprising a message indicating that payload data of said one link member shall not be used; and discontinue the reception of payload data for said one link member in response to said first forward control message, which allows the disabling of the member to be performed in a hitless manner, also when the disabling is initiated at the sink side.

Further, the network element may be arranged to receive subsequently a second management command from the management system for said one link member requesting said one link member to be re-enabled; transmit in response to said second management command a second return control message to the source side comprising an OK message for said one link member; receiving in response thereto a second forward control message from the source side comprising a message indicating that payload data of said one link member can again be used; and starting in response to said second forward control message the reception of payload data for said one link member on the sink side. In this way the disabled member can easily be re-enabled.

In an expedient embodiment the network element may comprise a state machine having a state, which can be entered by the reception of said first management command, and in which the machine is arranged to wait for the arrival of said first forward control message.

Expediently, the telecommunications network is a Synchronous Digital Hierarchy (SDH) network, or it can be an Optical Transport Network (OTN).

The invention also relates to a computer program and a computer readable medium with program code means stored thereon, which, when executed by a computer, causes the computer to perform the method described above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
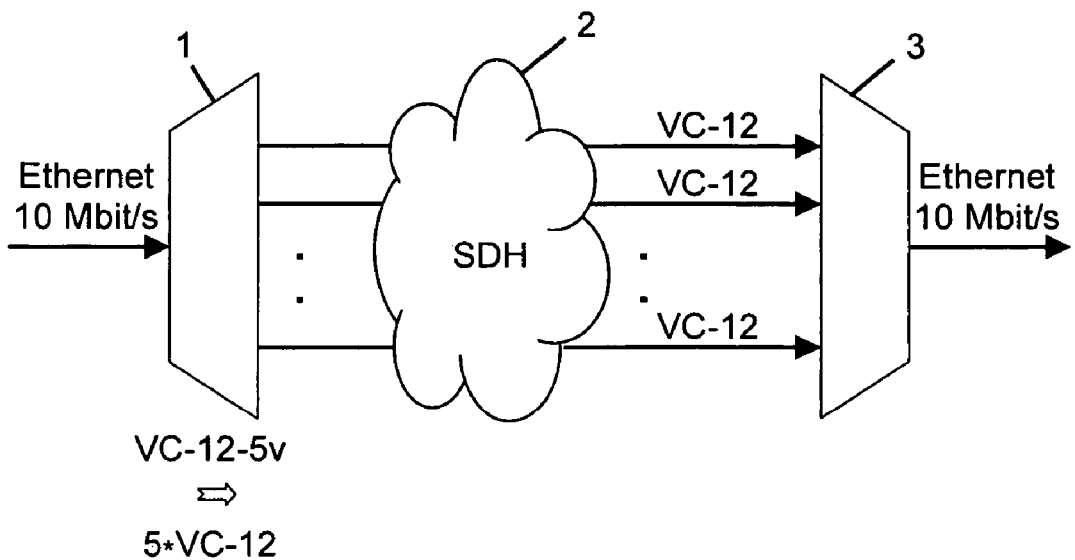
FIG. 1 shows an example of virtual concatenation used in an SDH network.

In FIG. 1 an example of the use of virtual concatenation is illustrated. Ethernet data of 10 Mbit/s are transmitted from one network element 1 through an SDH (Synchronous Digital Hierarchy) network 2 to another network element 3. For illustrative purposes the network elements are here shown as multiplexers/demultiplexers, although they comprise much additional circuitry. The 10 Mbit/s data are mapped into five VC-12 containers constituting a VCG (Virtual Concatenation Group), which can be denoted as VC-12-5v. The five containers are called the members of the VCG. As illustrated, the five VC-12 containers are transmitted as individual containers through the network. In the receiving network element 3 the containers of the VCG can be recognized on their overhead, and a differential delay caused by difference in optical path length can be compensated, so that the data of the five containers can be combined again and the Ethernet data recreated.

Many services, such as the Ethernet mentioned, have variable requirements for bandwidth over time, and thus there is a need to be able to increase or decrease the capacity of a VCG link by adding or removing members from the group in order to meet the bandwidth needs of the application. Further, in case a failure is experienced in the link for a member in the network, the transmission capacity needs to be decreased to avoid that the whole VCG fails. These functions can be handled by the Link Capacity Adjustment Scheme (LCAS) for virtual concatenated signals as specified by the ITU-T Recommendation G.7042/Y.1305. This Recommendation defines the required states at the source and at the sink side of the link as well as the control information exchanged between both the source and the sink side of the link to enable the flexible resizing of the virtual concatenated signal.

Figure 2:
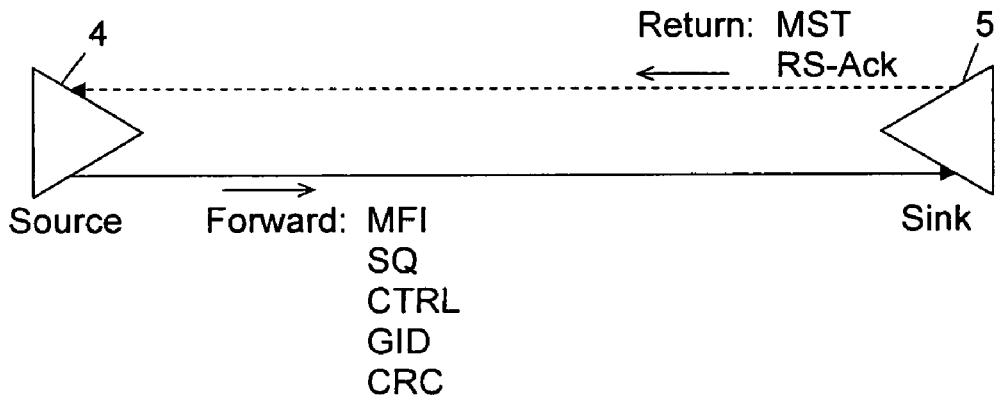
FIG. 2 shows information in control packets for a VCG member of a uni-directional link.

In LCAS, synchronization of changes in the capacity of the transmitter (source side) and the receiver (sink side) is achieved by control packets. Each control packet describes the state of a member of the link during the next control packet. Changes are sent in advance so that the receiver can switch to the new configuration at a predefined time. FIG. 2 shows an example of the allocation of information in the control packets exchanged between the source side 4 and the sink side 5 for a member of a uni-directional link. Each control packet consists of fields dedicated to specific functions. Control packets contain information sent from source to sink, i.e. the forward direction, and from sink to source, i.e. the return direction. It is noted that the payload data are sent in the forward direction, while the return direction is only used for the return control packets.

The information in the forward direction comprises a MultiFrame Indicator (MFI) field, a Sequence Indicator (SQ) field, a Control (CTRL) field, a Group Identification (GID) bit and a Cyclic Redundancy Check (CRC) field. The control field is used to transfer information from the source to the sink and member fail information from corresponding sink to source, and it provides commands indicating the status of the individual members of the group. Some of the possible forward commands or messages are $F_{NORM}$ (normal transmission), $F_{EOS}$ (End of Sequence, i.e. normal transmission for the member having the highest sequence number in the group), $F_{ADD}$ (this member is about to be added to the group), $F_{IDLE}$ (this member is not part of the group, or it is about to be removed) and $F_{DNU}$ (Do Not Use, which indicates that the payload of the relating container should not be used at the sink side).

The information in the return direction comprises a Member Status (MST) field and a Re-Sequence Acknowledge (RS-Ack) bit. The member status field reports the member status from sink to source with the two possible states OK and FAIL. Thus there are two return messages, $R_{OK}$ and $R_{FAIL}$. $R_{FAIL}$ is used when the sink side has detected a failure in the incoming data.

Figure 3:
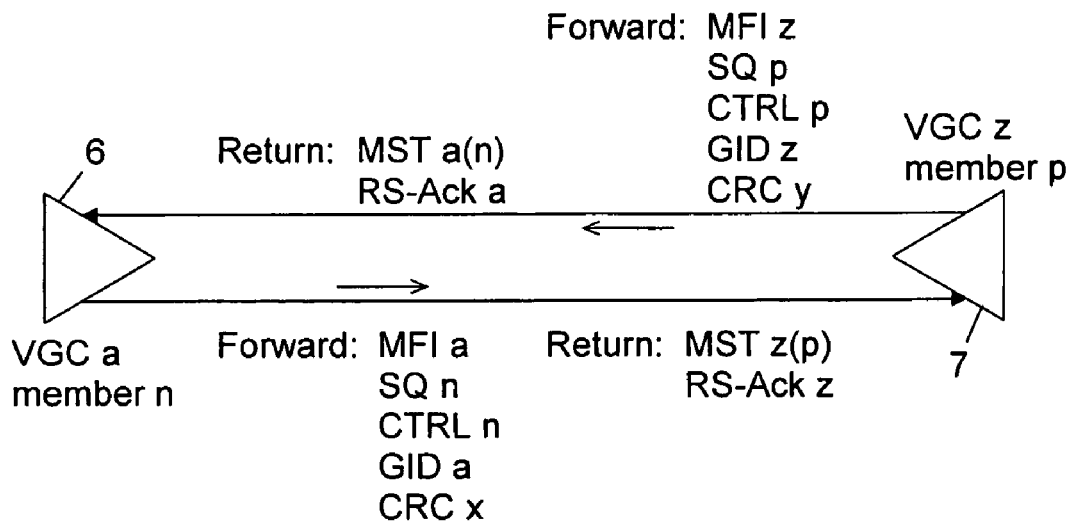
FIG. 3 shows information in control packets for a VCG member of a bi-directional link.

FIG. 3 shows an example of the allocation of information in the control packets exchanged between two network elements 6, 7 for one member of a bi-directional link, where each termination network element is a source for one direction as well as a sink for the other direction. Thus payload data as well as forward and return control packets are transmitted in both directions. In the direction from left to right payload data and forward control packets for member n of VCG a is transmitted, while payload data and forward control packets for member p of VCG z is transmitted in the direction from right to left. Corresponding return control packets are transmitted in the opposite directions.

The network elements of a link are controlled by one or more management systems. The management system can instruct network elements, i.e. source or sink side, to add members to or remove members from the group. This is done by sending management messages, such as $M_{ADD}$ and $M_{REMOVE}$.

Figure 4:
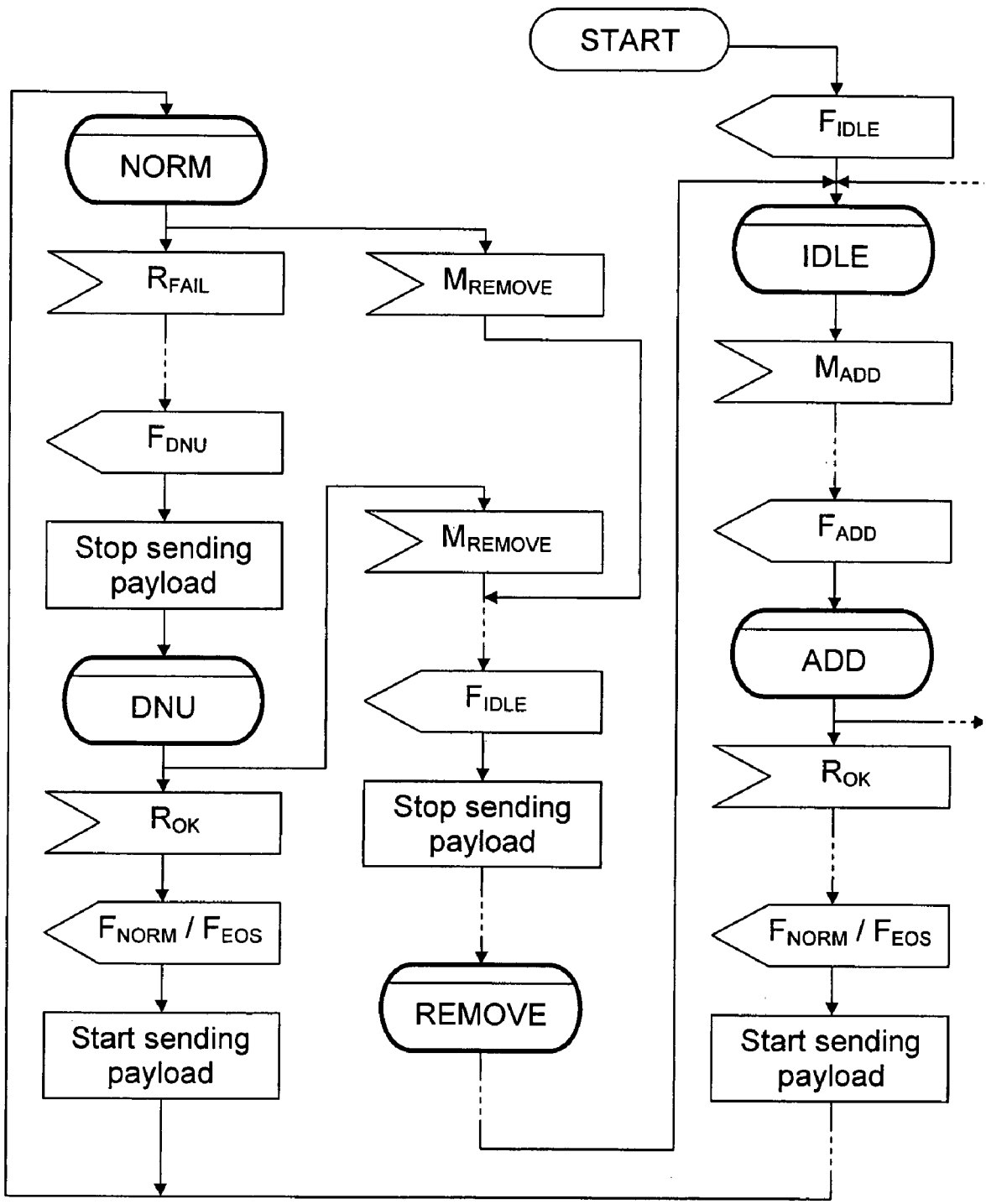
FIG. 4 shows a state diagram for a source end state machine.
Figure 5:
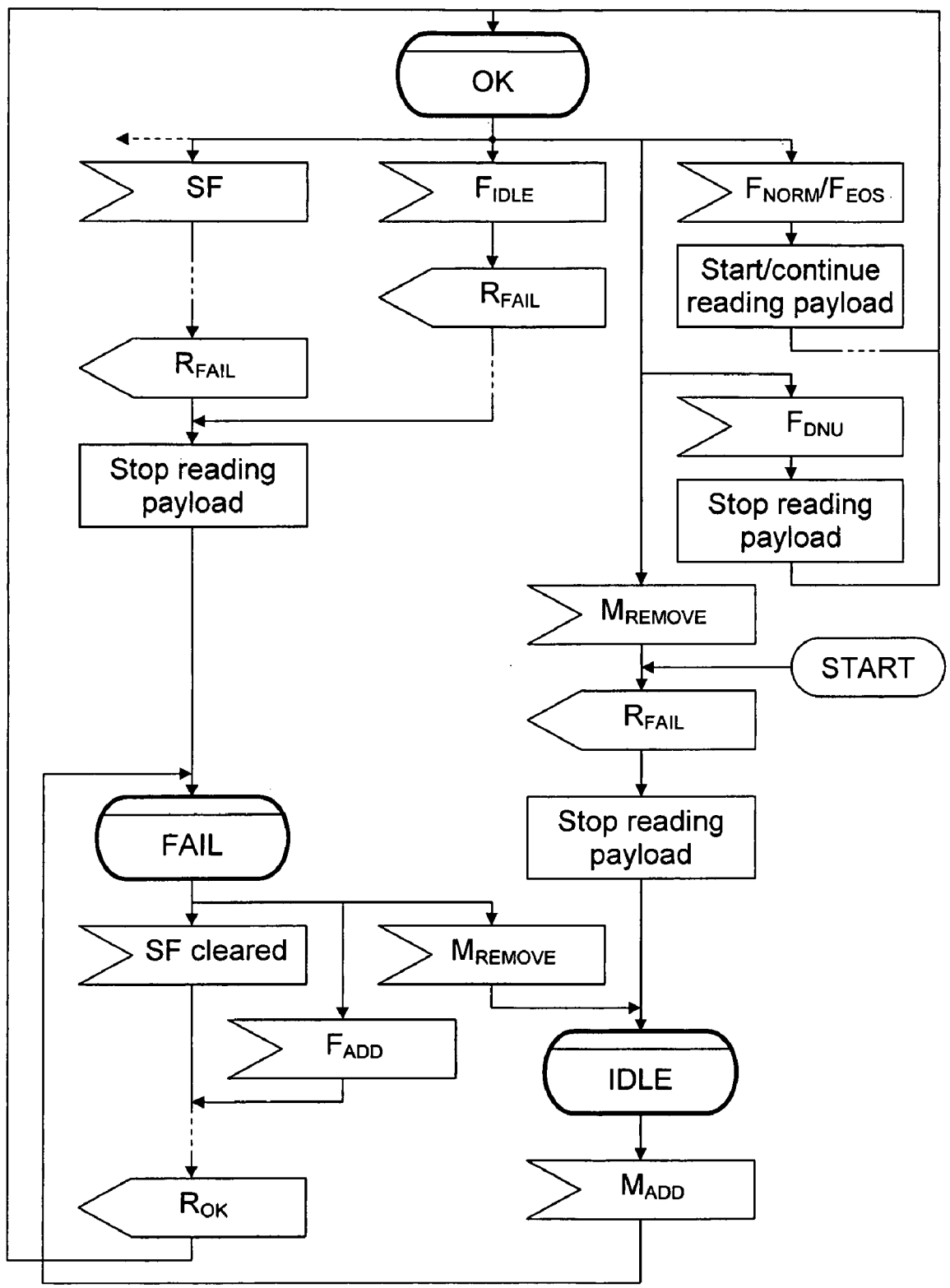
FIG. 5 shows a state diagram for a sink end state machine.

For each member of the group, i.e. each virtual container (VC), there is a state machine at the source end and a state machine in the sink end. FIGS. 4 and 5 show combined flow charts and state diagrams for the two state machines. These diagrams are specified in the LCAS Recommendation; however, FIGS. 4 and 5 have been simplified to show only those parts of the diagrams that are relevant for the understanding of the present invention. Removed parts are indicated with dashed lines in the transitions.

The state machine at the source end, which is shown in FIG. 4, can be in one of five states, i.e. IDLE (This VC is not provisioned to participate in the concatenated group), NORM (This VC is provisioned to participate in the concatenated group and no faults are detected for the VC), DNU (This VC is provisioned to participate in the concatenated group, but a fault has been detected for the VC (and reported to the source end)), ADD (This VC is in the process of being added to the concatenated group) and REMOVE (This VC is in the process of being deleted from the concatenated group).

The state machine at the sink end, which is shown in FIG. 5, can be in one of three states, i.e. IDLE (This VC is not provisioned to participate in the concatenated group), OK (The incoming signal for this VC experiences no hard failure condition or has received and acknowledged a request for addition of this VC) and FAIL (The incoming signal for this VC experiences some failure condition or an incoming request for removal of a VC has been received and acknowledged).

Figure 6:
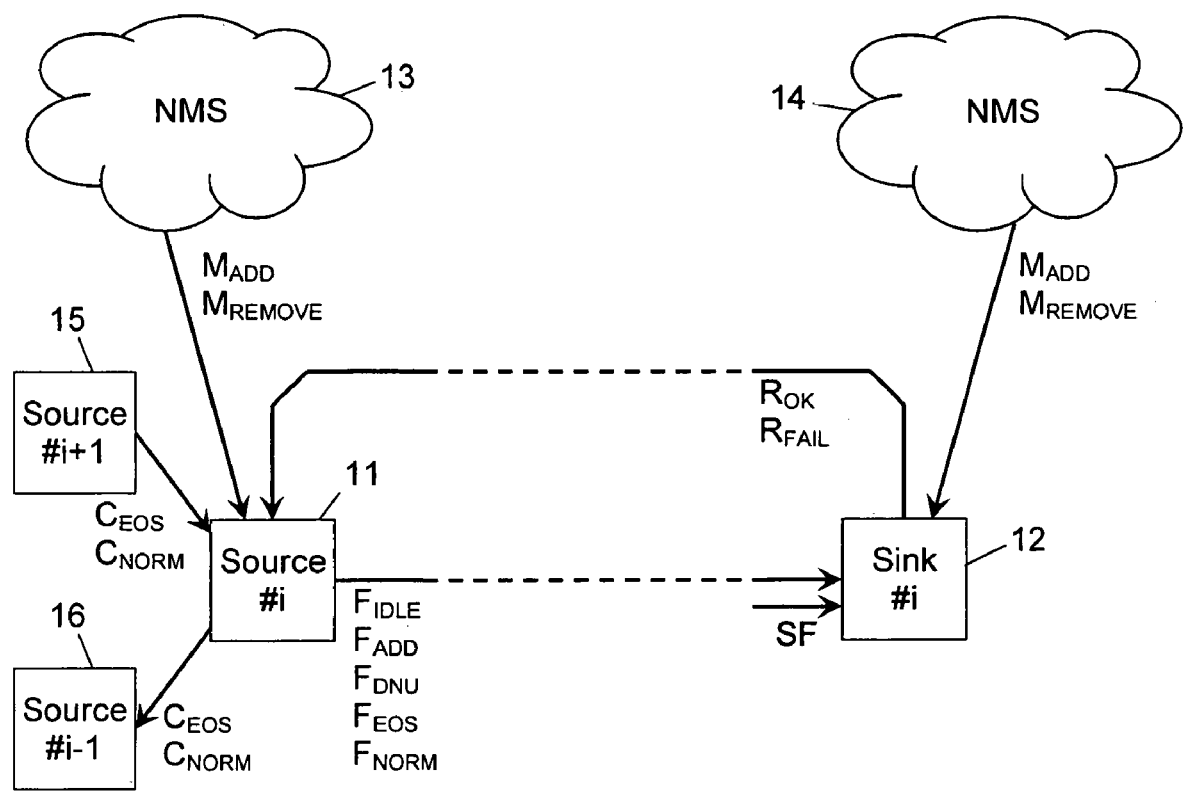
FIG. 6 shows interaction between the state machines of FIGS. 4 and 5.

These state machines run concurrently for all source and sink members of the group. The transitions between the states of the state diagrams are described in more detail below under use of some examples. The detailed interaction between the state machines is illustrated in FIG. 6, in which the forward messages $F_{NORM}$, $F_{EOS}$, $F_{ADD}$, $F_{IDLE}$ and $F_{DNU}$ may be sent from the source state machine 11 for member #i to the corresponding sink state machine 12, while the return messages $R_{OK}$ and $R_{FAIL}$ may be sent in the opposite direction. Another input to the sink state machine 12 is SF (Signal Fail), which indicates a failure condition in the incoming signal for this member.

Each of the two state machines 11 and 12 also receives inputs from a Network Management System (NMS) in the form of the management messages $M_{ADD}$ and $M_{REMOVE}$. In FIG. 6 the source state machine 11 receives messages from the NMS 13 and the sink state machine 12 from the NMS 14. This will typically be the situation when the two network elements connected by the link belong to different operator domains, but of course the two state machines may also receive their management messages from the same management system.

Further, on the source side messages $C_{EOS}$ and $C_{NORM}$ are also sent between the state machines of the different members of the group to indicate change of control words to ensure that the members are sequence numbered correctly. The physical channel of lowest number has no place to forward C messages. Correspondingly the C message input for the highest numbered physical channel is assumed to be $C_{EOS}$ (i.e. a request to signal $F_{EOS}$ if the channel is activated). The state changes in the source end state machine are based on the M and R messages only. The input C messages are then used—where required—when determining the output F and C messages.

Figure 7:
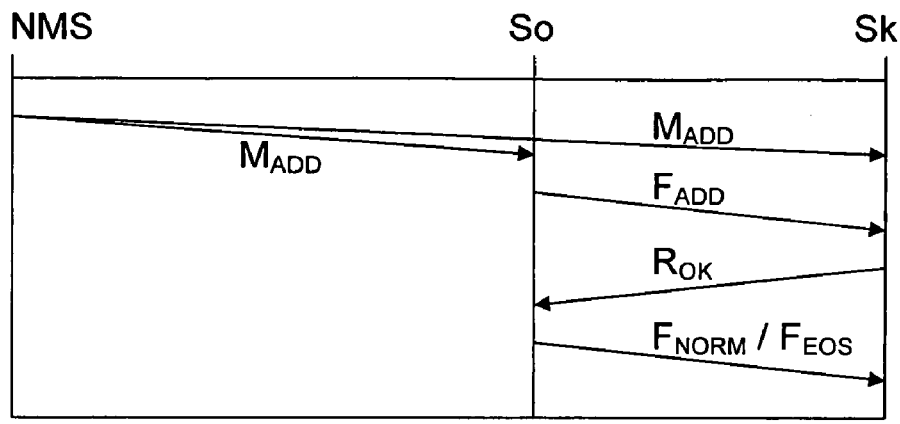
FIG. 7 shows a timing diagram for the addition of a new member to a VCG group.
Figure 8:
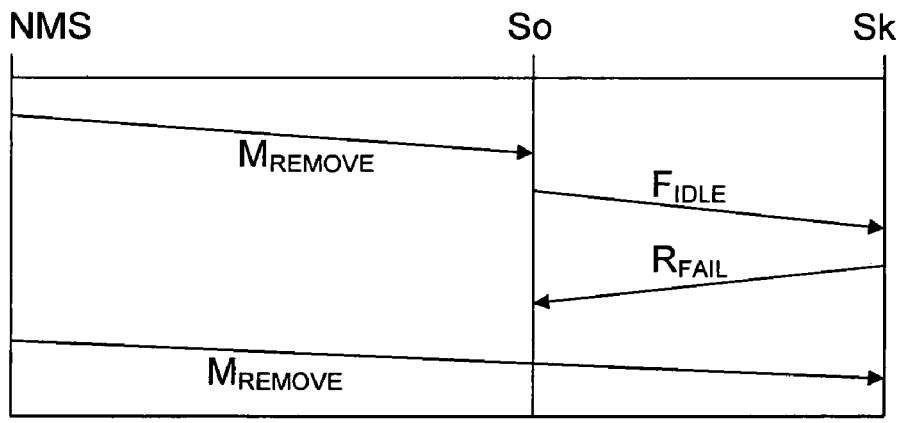
FIG. 8 shows a timing diagram for the permanent removal of a member from a VCG group.
Figure 9:
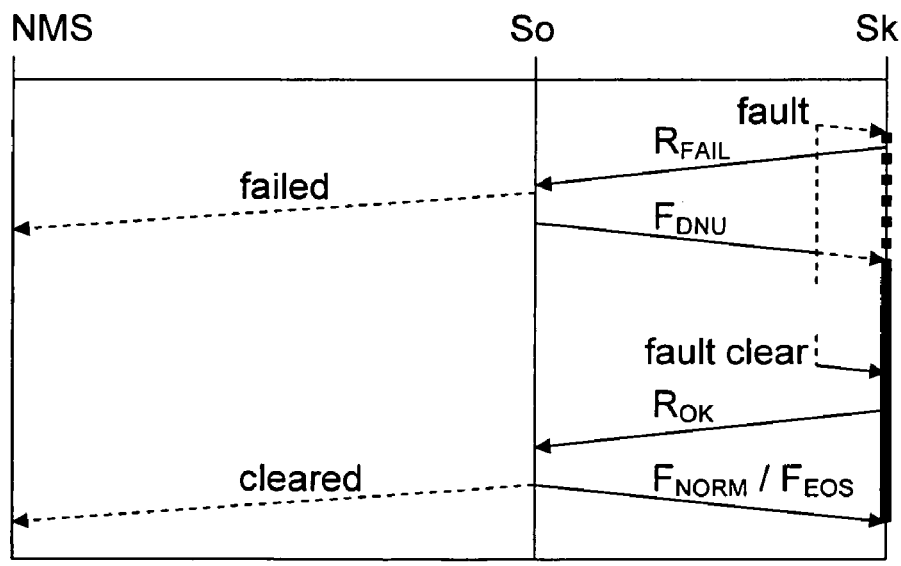
FIG. 9 shows a timing diagram for a temporary removal of a member from a VCG group due to a failure in the network.

The three main functions of the LCAS is to increase the VCG capacity by the addition of members, to decrease the VCG capacity by temporary removal of members due to a failure, and to decrease the VCG capacity by permanent removal of members due to a change in the bandwidth needs of the application. These three functions will be described in more detail below and at the same time used to illustrate the transitions between the states of the state diagrams in FIGS. 4 and 5. Corresponding timing diagrams are shown in FIGS. 7, 8 and 9. These diagrams are simplified and only intended to illustrate the main functions and messages for the member to be added or removed.

When the system is started, the source end state machine will send an $F_{IDLE}$ message and go to the IDLE state, in which it continues to send $F_{IDLE}$ messages. The sink end state machine will send $R_{FAIL}$ and go to the IDLE state, in which it continues to send $R_{FAIL}$ messages. This member is now ready to be added to the group.

When a new member should be added to the group an $M_{ADD}$ message is sent from the management system(s) to the source side state machine as well as the sink side state machine for the member to be added. The timing diagram is shown in FIG. 7. An $F_{ADD}$ command in the control field for the new member is sent in the forward control packet from the source to the sink, and the source enters the ADD state. The sink enters the FAIL state and waits for the $F_{ADD}$ to arrive. When this happens, it responds by sending $R_{OK}$ in the return control packet, and it enters the OK state. When the $R_{OK}$ message is received at the source, an $F_{NORM}$ or $F_{EOS}$ command is sent and payload data are inserted in the following containers for the new member. The source then enters the NORM state.

FIG. 8 shows the timing diagram for the situation where a member is removed permanently to adapt the VCG capacity to the bandwidth needs of the application. In this example the capacity reduction is initiated by sending a $M_{REMOVE}$ message from the management system to the source end state machine, which is supposed to be in the NORM state. As a response, the source sends an $F_{IDLE}$ command for the member to be removed, and the payload data are removed from the following containers. The source then enters the REMOVE state and, after a certain time, the IDLE state. When the $F_{IDLE}$ command is received at the sink, the sink end state machine responds by sending an $R_{FAIL}$ message in the return control packet. It also stops reading payload data, and then it enters the FAIL state. Finally, the management system sends a $M_{REMOVE}$ message to the sink, and upon reception of this message the sink end state machine enters the IDLE state. Thus the state machines in both ends are now in the IDLE state and the member has been removed from the group.

FIG. 9 shows the timing diagram for the situation where a failure in the network for a member of the group is detected at the sink. When this is detected (input SF on FIG. 6), the sink end state machine for that member will send $R_{FAIL}$ in the return control packet, stop reading the payload data and enter the FAIL state. However, it is noted that in the meantime the source continues sending payload data for the failed member. These data will be lost since the sink end no longer reads data, but they would probably be lost anyway due to the failure, or at least they would be unreliable. Upon detection of the $R_{FAIL}$ message the source end state machine will replace the $F_{NORM}$ or $F_{EOS}$ command for that member by a $F_{DNU}$ and remove payload data from the following containers. The source end state machine then enters the DNU state and the situation may be reported to the management system. In the DNU state the source end state machine continues sending $F_{DNU}$ messages, but due to the failure these messages may never reach the sink end.

When the defect causing the temporary removal is cleared this is detected at the sink, which will then send $R_{OK}$ for that member in the return control packet and enter the OK state. Upon detection of the $R_{OK}$ the source will replace the $F_{DNU}$ for that member by an $F_{NORM}$ or $F_{EOS}$ and start using the payload area of that member again. The source then enters the NORM state, and it may be reported to the management system that the failure has been cleared. It is noted that as soon as the fault is detected the sink will begin re-assembly of the VCG using only the remaining members. For the time until the $F_{DNU}$ message would have arrived at the sink the re-assembled data will be erroneous because the source still sends data on all members. From reception of the $F_{DNU}$ message and until $F_{NORM}$ is again received the source will send data only on the remaining members, i.e. the reconstructed data will be correct, but the bandwidth of the VCG will be reduced.

In addition to the three main functions described above, it would be expedient to be able to temporarily disable a member of the group from carrying payload. This will be useful when doing planned rerouting in the network. With the existing scheme this can only be done by first removing the member as described above using the $M_{REMOVE}$ command, and then subsequently, when the rerouting has been done, adding that member again using the $M_{ADD}$ command. However, in this way there is a risk that the channel that is added will not be the same as the one removed, and further, from a management point of view the two functions of removing a member permanently and disabling it temporarily are very different in nature. Therefore, a way of introducing the function of temporarily disabling a member is described below.

The new function is obtained by introducing a new management command called $M_{LOCKOUT}$ and a corresponding $M_{CLEAR}$ to return to the original situation. The function of temporarily disabling a member can be initiated at either the source side or the sink side, i.e. the management commands $M_{LOCKOUT}$ and $M_{CLEAR}$ can be sent to either the source side or the sink side.

Figure 10:
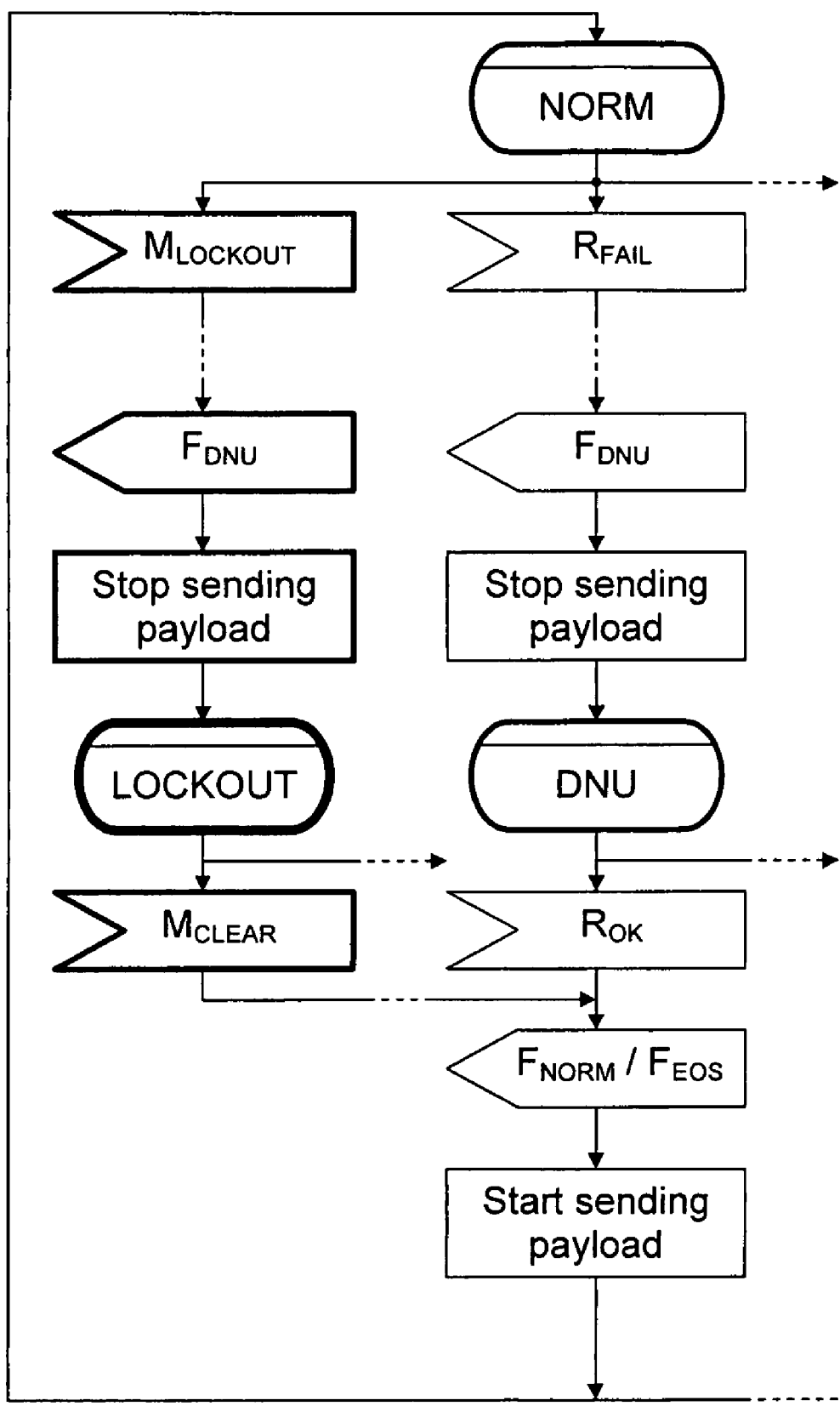
FIG. 10 shows the state diagram of FIG. 4 modified with a LOCKOUT state.
Figure 11:
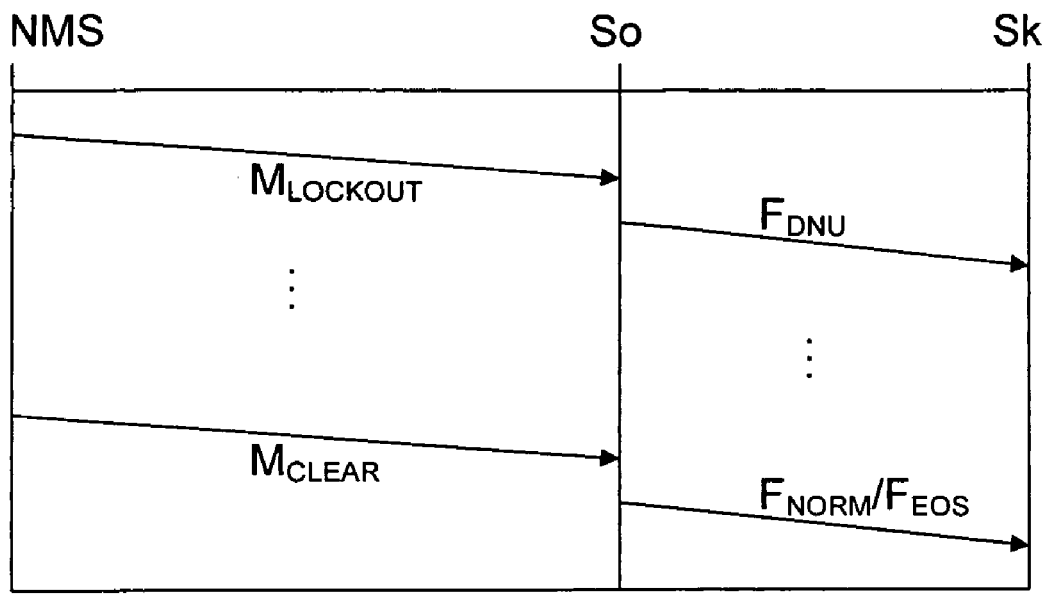
FIG. 11 shows a timing diagram corresponding to the state diagram of FIG. 10.

FIG. 10 shows how the state diagram of the source end state machine may be modified to allow initialization of a temporary disabling of a member from the source end. For clarity reasons only the new functions and the left part of the complete state diagram of FIG. 4 are shown. The inserted new functions are indicated with a thicker line. A corresponding timing diagram is shown in FIG. 11. When a management message $M_{LOCKOUT}$ is received, the state machine, which is supposed to be in the NORM state, sends an $F_{DNU}$ message and stops sending payload data. Then it enters a new LOCK-OUT state, in which it continues sending $F_{DNU}$ messages. When the $F_{DNU}$ message is received at the sink end, the sink end state machine, which is in the OK state stops reading the payload data and returns the OK state. Thus the member has now been temporarily disabled in both ends, and the rerouting in the network can be made, but it is noted that the member has not been removed.

When the rerouting in the network has been completed, the member is re-enabled by sending a management message $M_{CLEAR}$ to the source side. Upon reception of this message the source end state machine, which is still in the LOCKOUT state, replaces the $F_{DNU}$ message by an $F_{NORM}$ or $F_{EOS}$ and starts using the payload area of that member again. The source end state machine then enters the NORM state. When the $F_{NORM}$ or $F_{EOS}$ message is received at the sink end, the sink end state machine, which is in the OK state again starts reading the payload data and returns to the OK state, and the member can again be used for transmission of payload data.

It is noted that the new LOCKOUT state in the source end state machine is very similar to the DNU state, and actually the DNU state could be used also for this purpose if it was not for the fact that the DNU state is left on reception of an $R_{OK}$ message, while the $R_{OK}$ message should not have any effect on the LOCKOUT state. Alternatively, the DNU state could be changed so that if an $M_{LOCKOUT}$ message has been received, the machine must remain in this state until an $M_{CLEAR}$ message is received. Further it is noted that FIG. 10 only shows the main principles of the inserted new functions. In a practical implementation additional functions will be needed. As examples, it can be mentioned that an $M_{REMOVE}$ message should take the state machine from the LOCKOUT state to the REMOVE state, while on the other hand an $M_{LOCKOUT}$ message should take the state machine from the DNU state to the LOCKOUT state.

Figure 12:
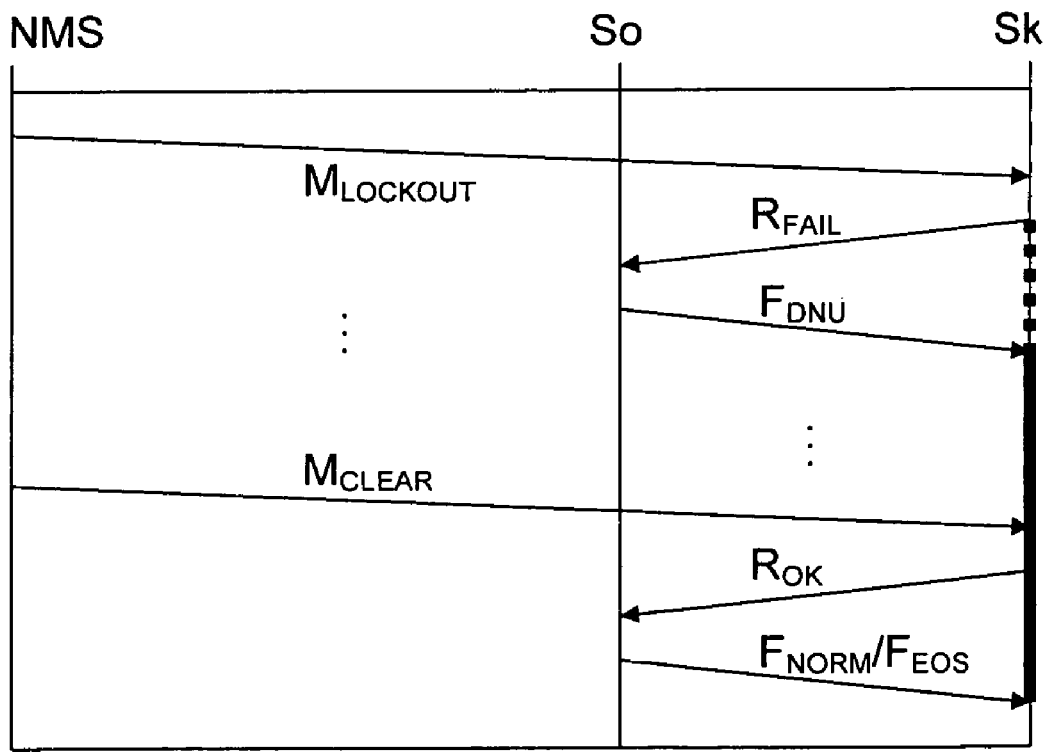
FIG. 12 shows a timing diagram of a different embodiment.
Figure 13:
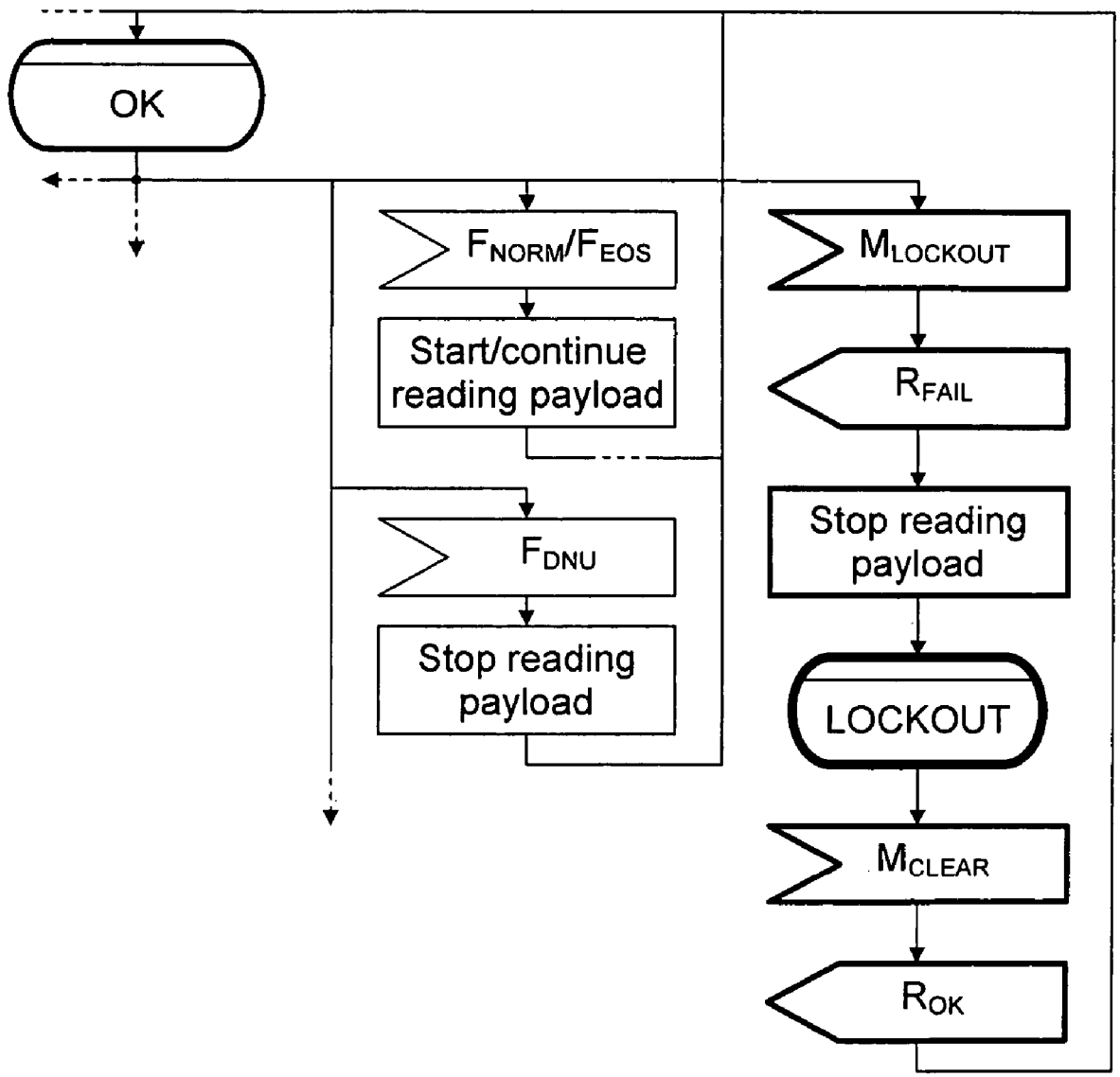
FIG. 13 shows the state diagram of FIG. 5 modified with a LOCKOUT state corresponding to the timing diagram of FIG. 12.

As mentioned, the temporary disabling of a member may also be initiated by sending an $M_{LOCKOUT}$ message from the management system to the sink side, and for this purpose the sink end state machine may be modified as shown in FIG. 13 with the corresponding timing diagram shown in FIG. 12. Again, for clarity reasons only a part of the diagram of FIG. 4 is shown together with the inserted new functions, which are indicated with a thicker line. The new functions are very similar to those performed when the state machine is taken from the OK state to the IDLE state by the $M_{REMOVE}$ command.

When the $M_{LOCKOUT}$ message is received in the sink end, the sink end state machine for that member will send an $R_{FAIL}$ message in the return control packet, stop reading the payload data and enter the new LOCKOUT state. Upon detection of the $R_{FAIL}$ message at the source end, the source end state machine will, if it is supposed to be in the NORM state and still sending payload data, replace the $F_{NORM}$ or $F_{EOS}$ command for that member by a $F_{DNU}$ and remove payload data from the following containers in the same manner as described above for the failure situation, and the source end state machine then enters the DNU state. If the source end state machine for some other reason already was in the DNU state, it will stay in this state. Thus the member has now been temporarily disabled in both ends, and the rerouting in the network can be made, but as above it is noted that the member has not been removed.

When the rerouting in the network has been completed and any fault has been cleared, the member is re-enabled by sending a management message $M_{CLEAR}$ to the sink side. Upon reception of this message the sink end state machine, which is still in the LOCKOUT state, will send $R_{OK}$ for that member in the return control packet and enter the OK state. Upon detection of the $R_{OK}$ the source, which is still in the DNU state, will replace the $F_{DNU}$ for that member by an $F_{NORM}$ or $F_{EOS}$ and start using the payload area of that member again. The source then enters the NORM state. When the $F_{NORM}$ or $F_{EOS}$ message is received at the sink end, the sink end state machine, which is now in the OK state, again starts reading the payload data and returns to the OK state, and the member can again be used for transmission of payload data.

In the embodiment just described the temporary disabling of a member is not performed in a hitless manner, as it is also the case according to the LCAS specification when a permanent removal of an active member is initiated at the sink side. As described above the sink end stops reading the payload data as soon as the $M_{LOCKOUT}$ message has been received and the $R_{FAIL}$ message sent, while the source end continues sending payload data on this member until it has received the $R_{FAIL}$ message and responded accordingly by sending an $F_{DNU}$ message. Thus the data received at the sink end in the time period between sending the $R_{FAIL}$ message and receiving the $F_{DNU}$ message will be lost. This is illustrated with the thick dashed line in FIG. 12. However, the sink end state diagram can be further modified to ensure that also a temporary disabling of a member initiated at the sink end can be performed in a hitless manner. Thus FIG. 14 shows an alternative to the embodiment of FIG. 13.

Figure 15:
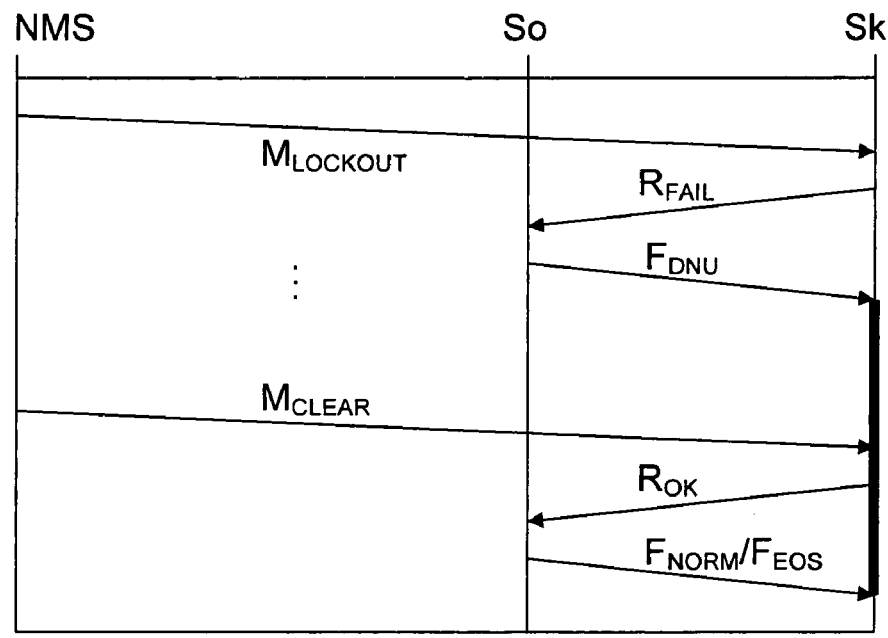
FIG. 15 shows a timing diagram corresponding to the state diagram of FIG. 14.

Upon reception of the $M_{LOCKOUT}$ message, the sink end state machine for that member will in this embodiment send the $R_{FAIL}$ message in the return control packet and enter the LOCKOUT state as before, but it continues reading the payload data, while it waits in the LOCKOUT state for the arrival of the $F_{DNU}$ message from the source end. When this message is received it stops reading the payload data since the $F_{DNU}$ message indicates that the source end has now stopped sending data. The sink end state machine then returns to the LOCKOUT state. In the corresponding timing diagram in FIG. 15 it is illustrated that data are no longer lost. Instead of waiting for the $F_{DNU}$ message, the sink end state machine could also just wait for the $F_{NORM}$ or $F_{EOS}$ message to be replaced by any other F message, which would indicate that the payload data are no longer valid, or a signal indicating that a failure or a fault has occurred, similar to the signal SF in FIG. 6. Thus with this further modification the temporary disabling of a member can be initiated from either the source end or the sink end, and in both cases the process can be performed in a hitless manner.

Figure 14:
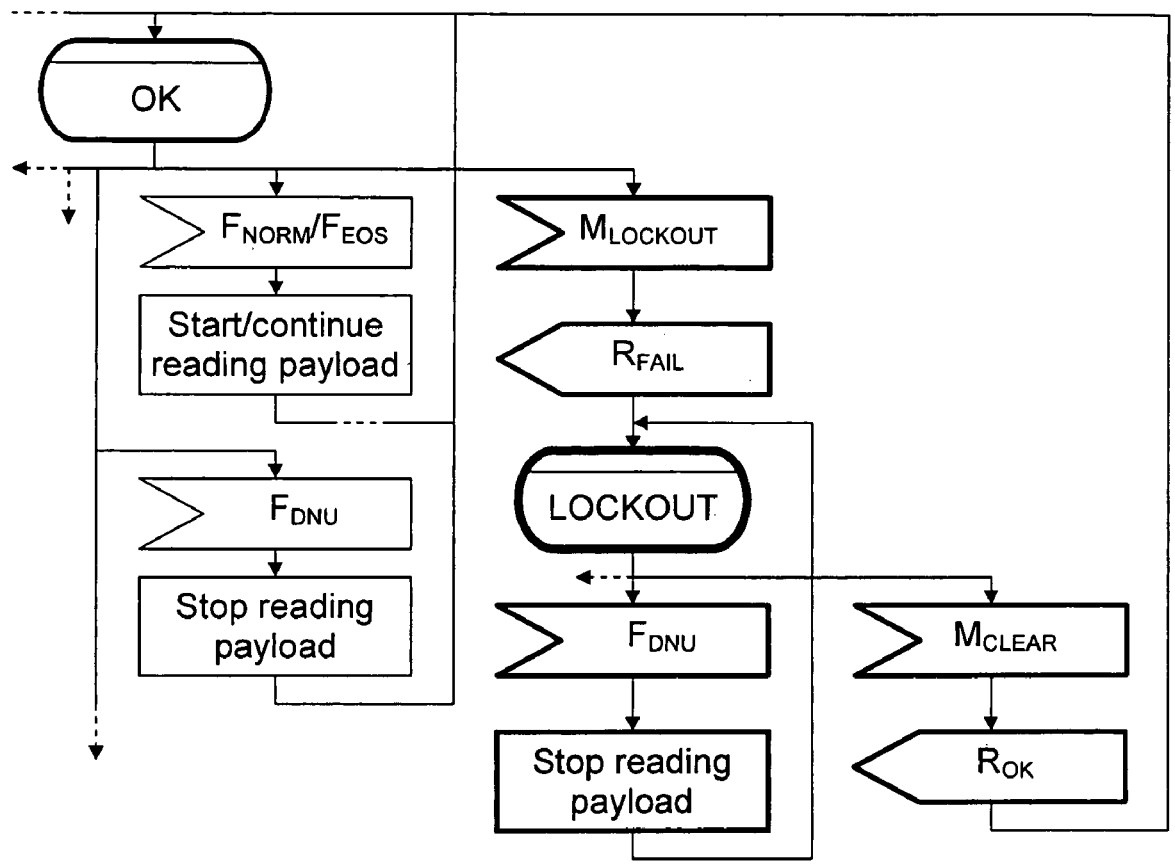
FIG. 14 shows a further modification to the state diagram of FIG. 13.

It is noted that FIGS. 13 and 14 only show the main principles of the inserted new functions. In a practical implementation additional functions will be needed. As an example, it can be mentioned that an $M_{REMOVE}$ message received in the LOCKOUT state should take the state machine to the IDLE state, since an instruction to remove the member permanently should be given a higher priority than the temporary disabling. As another example, it should be checked, when an $M_{CLEAR}$ message in received in the LOCKOUT state, whether a failure in the network has been detected for the member while it has been temporarily disabled. In that case an $R_{FAIL}$ message should be sent to the source end, and the state machine taken to the FAIL state.

Since the temporary disabling of a member as described above can be initiated at either end, i.e. the source end or the sink end, the function can also be used in networks that are operated and configured bidirectionally, where at least for some links payload data are transmitted in both directions. In such networks a given network element will be the source for transmission in one direction and the sink for transmission in the other direction. Thus a member can be temporarily disabled in both directions by sending an $M_{LOCKOUT}$ command to just one of the ends.

Embodiments of the invention relate to a computer program and a computer readable medium with program code means stored thereon, which, when executed by a computer, cause the computer to perform methods described above. It is understood by one of ordinary skill in the art that "computer readable medium" may refer to any conventional medium for storing program code instructions, e.g., a fixed storage medium such as a hard drive or a removable storage medium such as one or more DVD-ROM's, CD-ROM's, diskettes, tapes, etc.).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of temporarily disabling a member of a group of links that is transported from a source side to a sink side in a telecommunications network under control of a technique for adjusting link capacity of a given member in said group of links, wherein said group of links comprises a number of link members, in which payload data to be received at the sink side can be transmitted, the method comprising:
   in response to a first management command transmitted from a management system to at least one of said source side and sink side for one of said link members requesting said one link member to be temporarily disabled, disabling said link member on a channel at least one of said source side and sink side,
   maintaining said temporarily disabled link member to allow said temporarily disabled link member to be re-enabled on said channel;
   in response to said first management command, transmitting a first forward control message from the source side to the sink side comprising a message indicating that payload data of said one link member shall not be used and discontinuing transmission of payload data for said temporarily disabled link member; and
   re-enabling said temporarily disabled link member on said channel.

2. A method according to claim 1, further comprising:
   transmitting said first management command to said source side; and
   receiving said first forward control message at the sink side, and, in response thereto, discontinuing the reception of payload data for said one link member on the sink side.

3. A method according to claim 2, wherein re-enabling said temporarily disabled one link member on the same channel includes:
   transmitting subsequently a second management command from the management system to said source side for said one link member requesting said one link member to be re-enabled;
   in response to said second management command, transmitting a second forward control message from the source side to the sink side comprising a message indicating that payload data of said one link member can again be used and starting transmission of payload data for said one link member; and
   receiving said second forward control message at the sink side, and, in response thereto, starting the reception of payload data for said one link member on the sink side.

4. A method according to claim 1, further comprising:
   transmitting said first management command to said sink side;
   transmitting in response to said first management command a first return control message from the sink side to the source side comprising a fail message for said one link member; and
   receiving said first return control message at the source side and transmitting said first forward control message in response thereto.

5. A method according to claim 4, further comprising:
   discontinuing the reception of payload data for said one link member on the sink side in response to said first management command.

6. A method according to claim 4, further comprising:
   discontinuing the reception of payload data for said one link member on the sink side in response to said first forward control message.

7. A method according to claim 4, further comprising:
   transmitting subsequently a second management command from the management system to said sink side for said one link member requesting said one link member to be re-enabled;
   transmitting in response to said second management command a second return control message from the sink side to the source side comprising an OK message for said one link member;
   receiving said second return control message at the source side, and in response thereto, transmitting a second forward control message from the source side to the sink side comprising a message indicating that payload data of said one link member can again be used and starting transmission of payload data for said one link member; and
   receiving said second forward control message at the sink side, and, in response thereto, starting the reception of payload data for said one link member on the sink side.

8. A method according to claim 1, wherein the telecommunications network is a Synchronous Digital Hierarchy (SDH) network.

9. A method according to claim 1, wherein the telecommunications network is an Optical Transport Network (OTN).

10. A network device for functioning as a source side in a telecommunications network, in which a group of links can be transported from said source side to a sink side under control of a technique for adjusting link capacity of a given member in said group of links, wherein said group of links comprises a number of link members, in which payload data to be received at the sink side can be transmitted, the network device comprising:
    means for disabling one of said link members on a channel at said source side in response to a first management command transmitted from a management system requesting said one link member to be temporarily disabled;
    means for maintaining said temporarily disabled link member to allow said temporarily disabled link member to be re-enabled on said channel;
    responsive to said first management command, means for transmitting a first forward control message to the sink side comprising a message indicating that payload data of said temporarily disabled link member shall not be used and discontinue transmission of payload data for said one link member; and
    means for re-enabling said temporarily disabled link member on said channel.

11. A network device according to claim 10, further comprising:
    means for receiving subsequently a second management command from the management system for said one link member requesting said one link member to be re-enabled; and
    responsive to said second management command, means for transmitting a second forward control message to the sink side comprising a message indicating that payload data of said one link member can again be used and start transmission of payload data for said one link member.

12. A network element for functioning as a sink side in a telecommunications network in which a group of links can be transported from a source side to said sink side under control of a technique for adjusting link capacity of a given member in said group of links, wherein said group of links comprises a number of link members, in which payload data to be received at the sink side can be transmitted, the network element comprising:
    means for disabling one of said link member on a channel at said sink side responsive to a first management command transmitted from a management system requesting said one link member to be temporarily disabled;
    means for maintaining said temporarily disabled link member to allow said temporarily disabled link member to be re-enabled on said channel;
    means for transmitting in response to said first management command a first return control message to the source side comprising a fail message for said one link member;
    means for re-enabling said temporarily disabled link member on said channel.

13. A network element according to claim 12, further comprising means for discontinuing the reception of payload data for said one link member in response to said first management command.

14. A network element according to claim 12, further comprising:
    means for continuing reception of payload data after the transmission of said first return control message;
    means for receiving in response to said first return control message a first forward control message from the source side comprising a message indicating that payload data of said one link member shall not be used; and
    means for discontinuing the reception of payload data for said one link member in response to said first forward control message.

15. A network element according to claims 12, wherein means for re-enabling said temporarily disabled link member on the same channel includes:
    means for receiving subsequently a second management command from the management system for said one link member requesting said one link member to be re-enabled;
    means for transmitting in response to said second management command a second return control message to the source side comprising an OK message for said one link member;
    means for receiving in response thereto a second forward control message from the source side comprising a message indicating that payload data of said one link member can again be used; and
    means for staffing in response to said second forward control message the reception of payload data for said one link member on the sink side.

16. A network element according to claim 14, further comprising a state machine having a state, which can be entered by the reception of said first management command, and in which the machine is arranged to wait for the arrival of said first forward control message.

17. A network element according to claim 12 wherein the telecommunications network is a Synchronous Digital Hierarchy (SDH) network.

18. A network element according to claim 12 wherein the telecommunications network is an Optical Transport Network (OTN).

19. A computer program product comprising a computer usable medium having stored thereon computer program code means for performing a method of temporarily disabling a member of a group of links that is transported from a source side to a sink side in a telecommunications network under control of a technique for adjusting link capacity of a given member in said group of links, wherein said group of links comprises a number of link members, in which payload data to be received at the sink side can be transmitted, the program code means, when executed by a computer, causes the computer to:
    in response to a first management command transmitted from a management system to at least one of said source side and sink side for one of said link members requesting said one link member to be temporarily disabled, disable said link member on a channel at least one of said source side and sink side;
    maintain said temporarily disabled link member to allow said temporarily disabled link to be re-enabled on said channel;
    in response to said first management command, transmit a first forward control message from the source side to the sink side comprising a message indicating that payload data of said one link member shall not be used and discontinuing transmission of payload data for said temporarily disabled link member; and
    re-enable said temporarily disabled link member on said channel.

20. A computer program product of claim 19 wherein the telecommunications network is one of a Synchronous Digital Hierarchy (SDH) network or an Optical Transport Network (OTN).

21. A network device of claim 10 wherein the telecommunications network is one of a Synchronous Digital Hierarchy (SDH) network and an Optical Transport Network (OTN).

22. A method according to claim 1, wherein disabling includes temporarily disabling a link member at said sink side without a loss of data by: i) continuously reading payload data at said sink side while waiting for a return message from said source side; and ii) discontinuing reading of said payload data at said sink side upon receiving said forward control message from said source side.

23. A method according to claim 3, wherein said group of links is a Virtual Concatenation Group having a number of link members, in which payload data to be received at the sink side can be transmitted;
    wherein said technique for adjusting link capacity is a Link Capacity Adjustment Scheme (LCAS);
    wherein disabling includes disabling said link member on the channel at least one of said source side and sink side in response to a MLOCKOUT management command transmitted from the management system to at least one of said source side and sink side;
    wherein transmitting said second management command includes transmitting subsequently a MCLEAR management command from the management system to said source side for said one link member requesting said one link member to be re-enabled.

24. A network device according to claim 11, wherein said group of links is a Virtual Concatenation Group having a number of link members, in which payload data to be received at the sink side can be transmitted;
    wherein said technique for adjusting link capacity is a Link Capacity Adjustment Scheme (LCAS);

wherein means for disabling includes means for disabling one of said link members on said channel at said source side in response to a MLOCKOUT management command transmitted from said management system; and wherein means for receiving includes means for receiving subsequently a MCLEAR management command from the management system for said one link member requesting said one link member to be re-enabled.

25. A network element according to claim 15, wherein said group of links is a Virtual Concatenation Group having a number of link members, in which payload data to be received at the sink side can be transmitted;

wherein said technique for adjusting link capacity is a Link Capacity Adjustment Scheme (LCAS);

wherein means for disabling includes means for disabling said link member on said channel at least one of said source side and sink side in response to a MLOCKOUT management command transmitted from the management system to at least one of said source side and sink side; and wherein means for receiving includes means for receiving subsequently a MCLEAR management command from the management system for said one link member requesting said one link member to be re-enabled.

\* \* \* \* \*

UNITED STATES PATENT AND TRADEMARK OFFICE
CERTIFICATE OF CORRECTION

| | |
|---|---|
| PATENT NO. | : 7,684,327 B2 |
| APPLICATION NO. | : 11/291854 |
| DATED | : March 23, 2010 |
| INVENTOR(S) | : Flemming Gerdstrom |

It is certified that error appears in the above-identified patent and that said Letters Patent is hereby corrected as shown below:

In Column 15, line 57, replace "staffing" with --starting--.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,684,327 B2 | Page 1 of 1 |
| APPLICATION NO. | : 11/291854 | |
| DATED | : March 23, 2010 | |
| INVENTOR(S) | : Flemming Gerdstroem | |

It is certified that error appears in the above-identified patent and that said Letters Patent is hereby corrected as shown below:

Title Pg, Item (12)

Delete "Gerdstrom" and insert --Gerdstroem--.

Title Pg, Item (75) Inventors: the inventor's name is spelled incorrectly:

Please delete "Flemming Gerdstrom"

Please insert --Flemming Gerdstroem--.

Signed and Sealed this

Twenty-second Day of June, 2010

David J. Kappos
*Director of the United States Patent and Trademark Office*